United States Patent [19]
Allouche et al.

[11] Patent Number: 5,459,827
[45] Date of Patent: Oct. 17, 1995

[54] LAYOUT METHOD FOR STRUCTURED DOCUMENTS

[75] Inventors: Sylvia Allouche, Paris; François Lopez, Bois-Colombes; Rachid Charquaoui, Noisy-le-Grand, all of France

[73] Assignee: Bull S.A., Paris, France

[21] Appl. No.: 914,529

[22] Filed: Jul. 17, 1992

[30] Foreign Application Priority Data

Jul. 17, 1991 [FR] France .................. 91 09014

[51] Int. Cl.⁶ .................................................. G06F 17/21
[52] U.S. Cl. ............................................. 395/148; 395/145
[58] Field of Search .......................... 395/144, 145, 395/146, 147, 148, 149; 364/419.1

[56] References Cited

U.S. PATENT DOCUMENTS

| | | | |
|---|---|---|---|
| 5,173,853 | 12/1992 | Kelly et al. | 395/148 |
| 5,179,650 | 1/1993 | Fukui et al. | 395/148 |
| 5,323,312 | 6/1994 | Saito et al. | 364/419.1 |
| 5,379,373 | 1/1995 | Hayashi et al. | 395/148 |

FOREIGN PATENT DOCUMENTS

| | | |
|---|---|---|
| 0349461 | 1/1990 | European Pat. Off. . |
| 9108538 | 6/1991 | WIPO . |

OTHER PUBLICATIONS

Dengel et al., "From Paper to Office Document Standard Representation", Computer, v. 25, No. 7, pp. 63–67, Jul. 1992.

Molesworth, R., "The Open Interchange of Electronic Documents (Open Document Architecture (ODA))", IEE Colloquium, pp. 4/1–6, May 21, 1991.

Cole, F., "Document Structures for Integrated Text and Graphics", IEE Colloquium, pp. 6/1–3, Apr. 20, 1988.

Computer Communications, vol. 10, No. 1, Feb. 1987, London Z. Ma, "New Tools to Support ODA and ODIF", pp. 15–20.

AT&T Technical Journal, vol. 68, No. 4, Jul. 1989, pp. 33–44, Hansen: "Document Architecture Standards Evol.".

The Computer Journal, vol. 32, No. 6, Dec. 1989, GB, pp. 505–514; H. Brown: "Standards for Structured Docs".

Computer Communications, vol. 12, No. 2, Apr. 1989, London Hunter et al., "ODA: A Doc. Arch. for Open Sys." pp. 69–79.

Computers and Graphics, vol. 11, No. 4, 1987, Oxford pp. 377–387, W. Gruber: "Structures of an Integrated . . . ".

Primary Examiner—Mark K. Zimmerman
Assistant Examiner—Joseph R. Burwell
Attorney, Agent, or Firm—Kerkam, Stowell, Kondracki & Clarke; Edward J. Kondracki

[57] ABSTRACT

A layout method for formatting and reprocessing of structured documents containing text and graphics is employed by a formatting module. The method first performs reading of the generic logical structure, the specific logical structure, and the generic layout structure, in order to create a specific layout structure gradually by a plurality of recursive layout processes.

7 Claims, 9 Drawing Sheets

LAYOUT METHOD FOR STRUCTURED DOCUMENTS

FIELD OF THE INVENTION

The present invention relates to a method for laying out structured documents containing text and graphics, employed by a formatting module.

BACKGROUND OF THE INVENTION

So far, and in general, means for electronic exchange of documents meant for restoration, either on paper after printing or by on-screen display, have been developed with a view to enabling their reproduction on most types of available equipment by dynamically adapting the presentation of the documents to the characteristics of the equipment used; the presentation of the documents is therefore dependent on the equipment used.

European Patent Application EP-A 0 339 461 describes one method for achieving this objective, in response to what was once a major need, when especially few types of restoring equipment were available. By now this need has declined in importance and is tending to disappear with the widespread use of modern restoring equipment, and so less attention is paid to it. Moreover, given this widespread use, there is a disadvantage in that choosing one such objective precludes meeting another need, one whose principal objective is to allow document presentation independently of the restoring equipment. This requires that a standard of exchange be worked out, and using such a standard enables a response to this need, by advantageously favoring communications between individuals. Users of such a standard, when exchanging a document, will in fact analyze strictly the same document; the document received is the exact, faithful reproduction of the original document, regardless of the hardware and hence of the restoring equipment available. They can then have an effective dialog and during a telephone conversion, for example, can unambiguously refer to the nth word of line i of page j, this word being identical for all the users. However, to authorize such an exchange, the restoration equipment used must enable the reproduction of any arbitrary image, possibly with a different definition. This expectation can now be met, because of the widespread use of PCs with graphics capabilities and laser printers.

Telecopying or faxing is another current means of meeting this need and promoting communications between individuals by permitting the exchange of documents, which are converted into images that are described point by point. It has various other disadvantages, however. First, the volume exchanged is large, but the performance and quality of restoration are mediocre; and finally, the documents received cannot be processed.

An adequate standard of exchange makes it possible to overcome these disadvantages. Hence the international standard ODA (for Office Document Architecture) defines a representation of documents that offers different choices of forms of exchange between document senders and receivers. In this way, if it is not desirable to leave the option of processing them to the receiver (such as a printing service), it is possible to exchange the documents in purely formatted form. The documents can also be exchanged in a formatted form—which is processable if processing of them is desired. In these two cases, faithful restoration is guaranteed. In addition, the ODA standard authorizes the exchange of documents in a purely processable form, and in this third hypothesis, the receiver must format the document received, in order to be able to restore it. The result of the formatting depends on the receiver used, because the formatting process cannot be integrally standardized, among other reasons because the algorithms for word hyphenation depend on languages and habits, or because multiple algorithms for justification exist, and so forth. In this third case, however, uniformity of presentation of the documents is not guaranteed.

More particularly, and for better understanding of the concept of the invention, the ODA standard and definitions relating to it will now be discussed. In terms of its objectives, the ODA standard is defined in ISO 8613, published by the International Standards Organization (ISO); its main objective is to propose a model that facilitates the exchange of documents, by enabling, first, presentation of the document that is identical to the original presentation, and/or, in addition, easy processing for editing and reformatting of the document.

With this objective, a document architecture is defined, based on a set of rules specifying its structural model and its descriptive representation.

The structural model furnishes two different but complementary views of the contents of a specific document. A first view, called the logical view, associates the contents with structural elements, such as chapters, appendices, paragraphs, cross references, titles, figures, and so forth. A second view, relating to the layout, associates the contents with structural elements that relate to the medium of presentation, such as pages and zones defined within pages. These structural elements of a specific document are called "objects": logical objects or layout objects.

Thus the specific logical structure associates the contents of a document with a hierarchy of logical objects and authorizes the representation of a document in a processable form, while the specific layout structure associates the contents of a document with a hierarchy of layout objects and authorizes the representation of a document in a formatted form.

In addition, the structural model of a document enables distributing its contents among structural elements, hereinafter called content portions. The information in each content portion belongs to a particular type of contents, and the structure of that information is defined by a content architecture, consisting on the one hand in the definition of a set of content elements, control functions and attributes, and on the other in rules for application of the control functions and attributes to the content elements.

Moreover, the generic structure of a document assures the representation of the characteristics common to and related to a certain number of objects in a document. It also assures the representation of characteristics common to a group of documents.

In many documents, it is possible to encounter sets of objects that have common characteristics, such as logical objects representing portions that include a sequence of subordinate objects (of lower rank) relating to paragraphs and which have the same characteristics, or pages that would have the same headings and same endings, etc. A structural element of a document that has such a group of common characteristics is called an object class.

The generic logical structure is composed of all the classes of logical objects and the associated generic content portions of a document, while the generic layout structure is composed of all the classes of layout objects and the associated generic content portions of a document.

With respect to the descriptive representation of a document, this makes it possible to introduce the descriptive elements of a document architecture. A document to be exchanged will thus be represented as a collection of constituents (such as a document profile, the presentation style, the layout style, etc.), each of which is characterized by a set of attributes, and each attribute having a name and a value that designates either a characteristic of a structural element or a relationship with other constituents.

Based on this architecture using the aforementioned ODA standard, the present invention proposes a layout method for structured documents that does not have the various disadvantages of the known formatting tools and that very significantly favors communication between individuals.

Moreover, in a known manner that is intrinsic to the ODA standard described in ISO 8613, the layout method of the type described at the outset first reads the generic logical structure, the specific logical structure and the generic layout structure, in order to create the specific layout structure in the course of this reading.

ISO 8613 also proposes using a layout method for this purpose employed by the formatting module, including on the one hand a document layout process, creating the specific layout structure in accordance with the generic layout structure and the information derived from the specific logical structure, the generic logical structure, and when applicable the layout styles, and on the other hand, associated with the document layout method, a content layout process, using the information contained in the presentation styles and tasked with laying out the various content portions of the document in the available zones determined at the time the document layout process is applied.

Accordingly the various bits of information contained in the stream of data relating to the document to be processed and/or formatted is used to authorize the creation of the specific layout structure and thus, at the time of a document exchange, to permit exact and faithful reproduction (by printing or display) of the original document.

At the time the document layout process is applied, layout objects are created, and the zones available within these layout objects thus created are determined for formatting the contents of the document; this process then handles the attribution of these contents of these available zones determined for that purpose. Moreover, the content layout process uses the information contained in the presentation attributes; this information applies to the content portions to be put into layout in the predetermined available zones. These presentation attributes may with priority be obtained from the presentation styles that refer to the generic logical structure and the specific logical structure, and hence from the generic layout structure. The priority reserved to the presentation styles obtained from the generic and specific logical structures is explicitly indicated by the layout method in the specific layout structure created.

In summary, in a first period of time, the specific logical structure is read until either a layout directive designating a layout object, or a basic (noncomposite) logical object with contents to be formatted, is found. The layout structure is then analyzed in such a way as to find the layout object requested.

However, a problem arises in terms of management of the generic and specific layout structures by the formatting module. One solution is to analyze the generic layout structure, each time the formatting module requires a layout object, in order to learn whether this layout object can be created (in agreement with the contents of the subordinate objects generator attribute), and in what location. Next, the formatting module accesses the specific layout structure to create the layout object requested and the intermediate layout objects requested before that object. Such a solution is tedious and necessarily requires multiple checks and access to the object.

SUMMARY OF THE INVENTION

To overcome this difficulty and to optimize the layout method very sensitively, the method of the invention proposes employing an advantageous and effective solution.

In this solution, the layout method according to the invention is notable in that it uses a plurality of recursive layout processes; hence to create the specific layout structure, the highest-level object in the hierarchy of the specific layout structure, an object called a physical root, is created first, and then, depending on the generic layout structure, the "subordinate objects generator" attribute of the physical root is evaluated to create the entire structure requested, in such a way that each time the "subordinate objects generator" contains a requested or repetitive term, a layout object is created, while when it contains an optional term, an optional repetitive term, or a term of choice, a temporary object is created; next, based on the highest-level object in the hierarchy of the specific logical structure, which is an object called a logical root, the recursive processing is applied to all the subordinate objects of the logical root going back from one subordinate to the preceding, until that logical root is reached, when establishing constraints of creation and placement.

Consequently, when the formatting module requires a layout object, only the specific layout structure is analyzed, unless a temporary object is found. In that case, the generic layout structure is used to overcome the ambiguity, and the resultant set is then inserted into the specific layout structure, as many times as necessary.

A temporary object contains the evaluation of the generator attribute called the "subordinate objects generator" and this evaluation may involve an optional factor, an optional repetitive factor, or a choice factor. The temporary object indicates the position where it is found in the layout structure, and a potential layout object is effectively created as soon as a layout directive involving this potential layout object appears.

Finally, at the time of processing of the structure, the formatting module establishes two types of constraints, the creation constraints for creating a new layout object, for example, or a class of layout objects, and placement constraints, for example when concatenation is requested.

It is because of this systematic and rigorous information processing that the invention is capable of achieving the various advantages discussed above.

BRIEF DESCRIPTION OF THE DRAWINGS

The following description, in conjunction with the accompanying drawings, all given by way of non-limiting example, will make for better comprehension of how the invention can be achieved.

DESCRIPTION OF THE PREFERRED EMBODIMENTS

Figure 1:
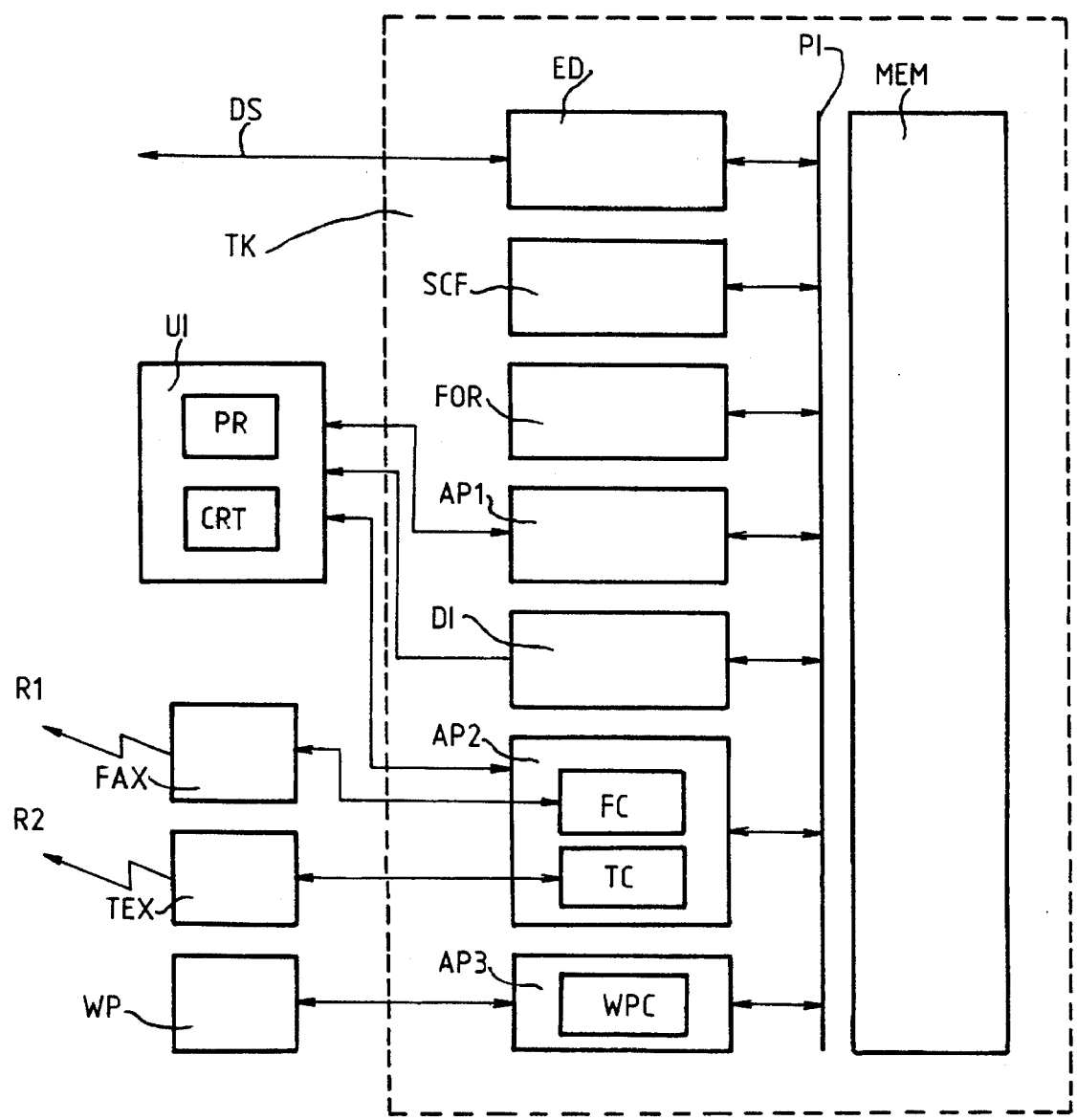
FIG. 1 schematically shows the environment in which the formatting module employing the layout method of the invention operates.

FIG. 1 schematically shows the environment in which the module for formatting the documents structured according to the invention operates. The formatting module FOR is included in a tool TK that is entirely suitable for performing the exchange of information (text and graphics) by the international standard ODA, and this tool comprises a plurality of modules.

The bidirectional data stream DS is received or sent by an encoding-decoding module ED. The information stream originating from external hardware, received by the module ED, transmitted in an exchange format ODIF by the ODA standard, is encoded in an format ODASM (developed and trademarked by International Computers Limited) adapted for internal storage in the tool in a module MEM. Conversely, the information stored in the module MEM of the tool TK in the ODASM format is sent by the module ED in the exchange format ODIF. The encoding-decoding process is meant to meet the objectives set by various entities relating to the document profiles, for which three levels have been defined; for EWOS, CEN/CENELC, these levels are Q111, Q112, Q113; for CCITT, they are PM11, PM26, PM36; and for ISO, although defined substantially differently, they are FOD11, FOD26 and FOD36.

Thus a module for encoding and decoding from the ODASM format, by the profiles Q111, Q112 or Q113, to the format ODIF makes it possible to convert an ODA document from a processable, formatted or formatted-processable form into an exchange format ODIF in accordance with the class-A data stream. All the attributes of the document profiles Q111, Q112 and Q113 stored in the module MEM—generic and specific logical and layout structures, presentation and layout styles, content portions, and profiles—are converted. Conversely, the encoding-decoding module enables converting a class-A data steam in the ODIF format into a document in the ODASM format, in accordance with Q111, Q112 or Q113, which is stored in the module MEM.

Once the stream DS has been converted into the internal format ODASM by the module ED, the dialog between the various modules and the module MEM for processing in the tool TK is assured by the applicative programming interface PI. The interface PI supports the selection, circulation and manipulation of the structures and objects of the document and checking by way of associated functions. Its role is to furnish a definition in a suitable language (such as C) of a set of data structures that enable representing the constituents ODA and their attributes and a set of functions that enable storage and authorize access to these data structures. Each module of the tool TK uses the interface PI in such a way that, in the module MEM, it can read a document ODA that has already been processed by some other module of the tool, and/or it can store the resultant document in the module MEM.

In this way, a document stored in a formatted-processable form can optionally be processed such that it can be reduced to either a formatted form or a processable form. To do so, the tool TK includes a class and structure filtering module SCF, which in the module MEM, by way of the interface PI, processes the documents that have been read and are in the internal format ODASM, and produces documents that are always in the format ODASM so that they can be stored, by way of the interface PI, in the module MEM.

To obtain documents in a formatted form from a formatted-processable form, the filtering module SCF eliminates the generic and specific logical structures and the layout styles of the document received. When the document is produced in this formatted form, it cannot be displayed on a screen, or printed, or after conversion in the module ED retransmitted to the data stream in the format ODIF.

Similarly, to obtain documents in a processable form from a formatted-processable form, the filtering module SCF eliminates the specific layout structure, and deletes all the information relating to the layout checking functions in the content portions. The documents thus processed can then be converted into a desired word processing format.

Various capabilities are offered in order to work out the diagnostics, by enabling examination of the structures and attributes of a document ODA. To do this, a diagnostic module DI includes a plurality of components that authorize specific searches in a document ODA; the source document ODA may be one of the three following forms: formatted, formatted-processable, and processable. Among these components, the main characteristic of a first component is to generate a file that contains the treelike structure of the objects of an ODA document in the internal format ODASM. Once this file has been generated, it can be displayed on a screen CRT and printed on paper PR by way of a user interface UI. Similarly, a second component makes it possible to generate a file that contains all the structures of a source document ODA in the internal format ODASM; the file can also be displayed on the screen CRT and printed on paper PR. The structures contained in the file correspond to the generic and specific logical structures, the generic and specific layout structures, the content portions, the presentation and layout styles, and the document profiles.

The tool TK also includes a plurality of applications modules AP1, AP2, AP3, and so forth.

A first applications module AP1 enables the user of the tool TK to perform various operations on the documents ODA: ODIF conversion from and back to ODA, formatting, browsing in the document (checking display or printing of the document with direct access to the logical and layout structures, authorizing access to the pages, paragraphs, chapters, and so forth), scrolling through the document, and reducing or enlarging part of the document displayed; the record of the last ten accesses is saved.

A second applications module AP2 authorizes the exchange of documents using services such as Teletex TEX or telecopying FAX. Documents generated by word processing and graphics editors or documents composed of digitally encoded pages can be selected by a user and then transmitted to various receivers R1, R2, . . . , Rn with external hardware. Similarly, documents received by way of the Teletex or telecopying services TEX or FAX can be displayed (CRT), printed (PR) or memorized (MEM) in the ODASM format, which is common to all the applications of the tool TK, so that they can later be processed by any one of the applications OSA of the tool TK.

To this end, the module AP2 includes a fax converter FC and a Teletex converter TC. The converters FC and TC convert the internal documents from the ODASM format to the proper format for transmission to the external hardware, such as the T.4 format for faxing and T.61 format for Teletex, and assure the converse conversion with the documents received by way of these services.

Another applications module AP3 includes a converter WPC for transmitting encoded text; encoding of documents containing text and graphics makes it possible to facilitate their transfer. For this application, the document is sent in encoded fashion from an external word processing machine WP to the tool TK. The converter WPC accordingly has the role of translating the format of the encoded word processing to the internal format ODASM, and vice versa.

Finally, as noted above, the tool TK includes the module FOR for formatting structured documents containing text and graphics, which employs the layout method of the invention in accordance with the standard ODA. The documents read at the input or produced at the output of the module FOR are naturally in the internal format ODASM.

In accordance with the proposals of ISO 8613, in this layout method, reading of the generic logical structure, the specific logical structure, and the generic layout structure is done first, to create the specific layout structure in the course of this reading.

Similarly, the layout method used by the formatting module includes, on the one hand, a document layout process, creating the specific layout structure in accordance with the generic layout structure and the information derived from the specific logical structure, the generic logical structure, and when applicable the layout styles, and on the other hand, associated with the document layout process, a content layout process, which is tasked with laying out the various content portions of the document in the available zones determined at the time the document layout process is applied.

Advantageously, the layout method according to the invention is notable in that it uses a plurality of recursive layout processes; hence to create the specific layout structure, the highest-level object in the hierarchy of the specific layout structure, an object called a physical root, is created first, and then, depending on the generic layout structure, the "subordinate objects generator" attribute of the physical root is evaluated to create the entire structure requested, in such a way that each time the "subordinate objects generator" contains a requested or repetitive term, a layout object is created, while when it contains an optional term, an optional repetitive term, or a term of choice, a temporary object is created; next, based on the highest-level object in the hierarchy of the specific logical structure, which is an object called a logical root, the recursive processing is applied to all the subordinate objects of the logical root going back from one subordinate to the preceding, until that logical root is reached, when establishing constraints of creation and placement.

Accordingly, the physical root is created first, then the "subordinate objects generator" attribute is evaluated; everything that is requested and hence is not optional is created, to work out an embryonic layout structure. Next, the logical objects are read, establishing constraints of creation and placement. Each object is searched for using the recursive "Give object" function, which is subdivided into "Give object ext" and "Give object kernel" (explained hereinafter), which makes it possible to find the object that corresponds to the specified directives; if the object is not found, it is created. The content layout process is now invoked, for placing the contents thus processed, if the remaining editable zone is large enough. If it is, the remaining editable zone is determined for the next content placement operation. If the editable zone is not large enough, the content is placed after this zone, as long as no directive prohibits that. If a directive prohibits this displacement, then an operation known as backtracking is imposed in order to fulfill this directive, which involves reformatting of one or more objects.

Repetitive terms also present a problem, which the method of the invention is capable of solving in the following way. In the present context, "repetitive" means that the objects involved must be created at least once. Thus each time a repetitive term is contained in a "subordinate objects generator" two different objects are created and inserted: an obligatory object, or a sequence of corresponding objects, and a temporary object that contains an optional repetitive term. This enables the formatting module to create, at least once, the objects specified as repetitive, and if it should be necessary to create them once again, it would then suffice to use the temporary optional repetitive object as many times as necessary.

Similarly, "optional repetitive" means that the objects involved can be created zero times, once or multiple times. Once a temporary optional repetitive object is used (for example requested by a layout directive), the corresponding objects are created and inserted, and then another equivalent temporary optional repetitive object is created, which enables the formatting module to repeat this operation as many times as necessary.

The following considerations will make it possible to better define the terminology used and the field to which the present invention applies.

When a layout object requested has been found in the already existing specific layout structure, or has been created, it is called the current layout object, and the information to which it belongs is called the current information stream. The logical structure is generally processed until some other layout object must be searched for. The search is then done ahead of the current layout object, within the information stream of information in question.

According to the invention, the analysis of the structure is based on the principle of recursion. The formatting module is subdivided into submodules. Among these submodules, some are specifically provided for employing the document layout process, and mainly, a first recursive submodule, called the logical submodule, enables reading logical objects until access to the layout structure is gained. There are also two recursive submodules, called layout submodules, that enable analysis of the layout objects until the one requested has been found. Thus the first layout submodule searches for a layout object in a given set of layout objects. It is recursive and is invoked by the second layout submodule. The second one is invoked by the logical submodule; it seeks the current layout object contained in the current information stream and invokes the first layout submodule to search within the set of layout objects. If the search is unsuccessful, then it invokes itself to search for the current, major layout object, and so forth.

The recursive "Makelayout" function (explained hereinafter) is employed by the logical submodule, which invokes the recursive "Give object ext" function employed by the second layout module, which in turn invokes the recursive "Give object kernel" function employed by the first layout submodule. That is, the various recursive submodules are nested in one another.

Processing layout categories involves an examination of the various layout information streams, which means that during the application of the layout method, multiple current layout positions are considered, each corresponding to one layout information stream. To format a logical object, the corresponding layout object must be inserted into the layout structure, from the current position of the information stream in question.

The mechanism is based on a table of structures, in which the current layout position, the preceding block, and the corresponding layout category are stored, for each layout information stream. The various current layout positions must be considered, if a layout object is to be searched for in the layout structure, either as requested by layout directives or when a block must be created. In both these cases, the following question arises: Which position should be the starting point for the search for the layout object desired? This position is fixed in accordance with the layout categories involved. When the current layout object to be considered is identified, the layout method is applied simply until some other layout category is to be considered. Indeed, throughout the entire layout method, the current layout position and the current layout position within the stream of layout information (stored in the table of structures) are identified.

In considering a layout category, the new current layout position must be calculated in compliance with the current layout position in the proper layout information stream. If the layout category is not present in the table of structures, then a new entry is created in the table for that layout category, and its current corresponding position is set at the value of the identifier of the object of the current page. The current stored position for the layout information stream in question becomes the current layout position. The layout information streams are identified by a number corresponding to their place in the table of structures. The current position of each layout information stream must be updated when necessary, which is done in two different cases: when a new object logical is analyzed, and when a block is created.

Each time a logical object is analyzed, the layout styles (if any) and the layout styles of its class (if any) are read. All the layout categories involved, in accordance with the ODA standard, are combined together (if the logical object is a basic object, only a single category is involved). In the majority of cases, the farthest-ahead layout information stream is identified, and all the other layout streams involved are synchronized to the most advanced one; that is, their current layout positions are fixed at the most advanced position.

When a block is created, the current layout position of the current layout information stream is likewise fixed at the block.

The search for layout objects is done beforehand in the specific layout structure, beginning with the current object (in the current information stream). During this search, the layout objects are verified and closed if possible. This enables the method of the invention to be executed in one run. When the layout object is closed, it is frozen; nothing can be added to it or taken from it, except in the case of backtracking (this operation is explained hereinafter). Its definitive dimensions are fixed in the course of the closure procedure.

During a search for a layout object, a layout object is closed (corresponding to the current layout object of a current or preceding layout information stream) when this object does not meet the characteristics requested and cannot be used for a layout information stream. This corresponds to the following cases:

- a block is completed; this is the case when a block is full, and also when some other block in the same layout information stream must be created to format a new logical object;

- a layout object is full or completed; this is the case when a new frame with a variable position must be positioned inside the page, and when there is a preceding frame of the same master copy of the same order, the master copy frame is closed, and also when a layout object is full when there is no longer any space in it for additional contents;

- a layout object has a class corresponding to a layout directive of the "layout object class" type applying to a logical object that has been fully formatted;

- synchronization of layout information stream when a current layout information stream position is displaced forward;

- at the end of a layout method, when the already opened layout objects must be closed.

Solely in the case where it is necessary to backtrack to the layout structure, one or more layout objects may be deleted. During the application of the layout method, it may in fact be necessary to return to certain portions of the document that have already been formatted, for instance if it is later discovered that certain layout directives have not been taken into account. There is no way whatever of detecting such a problem before it appears.

Hence a layout object may have been created and correctly filled, but a later step in the process involves backtracking to this object and modifying it. Three cases can arise. In the first case, a content portion still remains to be formatted in this layout object, for example:

- the logical object contains a directive of indivisibility, and the layout object is not large enough to contain the entire contents of the logical object;

- the contents of the logical object are graphic (consequently the contents are indivisible) and the layout object is not large enough to hold all of it;

- the logical object includes a layout directive of the "layout objects class" type and the layout object is not large enough to contain the entire contents of the logical object;

- the logical object includes presentation attributes that set the "size of an orphan portion" and the "size of a widow portion" (part of an object, such as a paragraph located at the top of a page), while it is then formatted on two pages, but it is not possible at the same time to be in conformity with both the "size of the orphan portion" on the first page and the "size of the widow portion" on the second page. Consequently, the entire object must be displaced to the second page.

In the second case, there is no longer any content for the current logical object to be laid out in the layout object, but the processing of the next logical object requires the preceding layout objects; for example:

- a layout arrangement of the "same layout object" type applies to the logical object and cannot be adhered to without modifying the layout of the preceding logical object;

- there is not enough space to lay out a footnote at the bottom of the page in the frame provided for such a footnote;

- there are no other logical objects; the document is fully laid out, but the specific layout structure is incorrect.

Finally, in the third case, the current layout object is ready to be closed, but has to be modified for the following reasons:

- the object relates to a frame in which several columns must be balanced; the subordinate objects (columns) must have the same vertical size, and if they do not, then some of the contents must be displaced; or

- the object relates to a multi-column frame and a footnote frame of the same family, where the vertical column dimensions must be modified, for example to leave enough room for the footnote.

In addition, certain objects may be deleted during the process of closing them, if the contents are empty (the object has not been used) or upon backtracking (for an object found unsuitable).

For preventive purposes, a specific mechanism is employed to avoid the process of backtracking in a loop to a directive that is impossible to fulfill. Once the backtracking process has been started, the layout directive and the logical object involving this process are stored in a register (or stack). When a logical object that involves such a process has been processed (even without success), the stack is decremented.

Before a backtracking process is started, the top of the stack is tested. If it already contains the layout directive and the logical object, for which directive and object the process is to be started, then the layout directive is ignored and a warning is given.

The principle of backtracking is notable in the following respects:

- the first step consists in a search via the layout modules and layout objects to be displaced and the corresponding logical objects, or vice versa (applicable), the correspondence being done by using the content portions that are the only link between the layout structure and the logical structure;

- the second step consists in a search for the major object that is to be reformatted and is common to all the logical objects addressed by the process, this object being flagged, and so forth for each hierarchical level, with the first object involved in the process being flagged;

- the third step consists in displacing the layout objects and the content portions in question;

- the fourth step consists in a dialog between the layout submodules, which send an error message to the logical submodule (employing the recursive "Makelayout" function) that processes each logical object and verifies whether the logical object in question is flagged; if so, then it reformats it and all the subordinate objects to be reformatted (all those that are flagged), while if not, it responds with an error message.

The backtracking process is generally involved in the layout directives. However, there is also one special case: when a logical object is laid out over two pages and its "widow" presentation attribute value requires displacing all the contents of the first block of the first page to the second page. This case is explored by the content layout process, which sends the information to the logical submodule that applies the document layout process. In that case, the backtracking process is under the command of the logical submodule, rather than the layout submodules.

In the method according to the invention, a non-obligatory layout object can be created without a directive. This is the case when objects originating in the "subordinate objects generator" and containing an expression with an optional, optional repetitive, or choice term must be created, or need not be created if not requested by a layout directive. For example, upon the application of the layout method, a block is necessary to lay out the contents of a logical object when there is no layout constraint or directive applying to this object, but the next object in the layout structure is an optional, optional repetitive or choice term. The procedure is different depending on the situation.

In the case of a choice term, in the absence of a layout directive, the choice by default consists in opting for the first element.

In the case of an optional repetitive term, in the absence of a layout directive, an optional repetitive object can be created by inserting a content fraction. Each time space is requested for laying out a fraction of the contents, this object can be created (repeated).

In the case of an optional term, two interpretations are possible. An optional term can be interpreted as an object that must be created only if it is requested by a layout directive. Otherwise, an optional term can be interpreted as an object to be created when the formatting module requires a space for laying out a function of the contents.

The first intepretation makes it possible to create an optional object only if a layout directive requires it. The second interpretation makes it possible to create such an object when a space is requested for a fraction of the contents. These two interpretations are incompatible. To overcome this ambiguity, the following decisions were made:

- to create an optional object only by a layout directive, if that object is the first in a sequence; and

- in the other cases, to create an optional object by dividing the contents.

The various functions applied to the document layout process and to the content layout process will be described below.

As a preliminary comment, and to summarize the function of the formatting module ODA that employs these processes, the following essential phases will be recalled.

In a first phase, called initialization and checking, the formatting module FOR opens the document ODA to be handled. In a second phase, it creates the specific layout root and defines part of the current logical object as being the logical root and another part of the current layout object as being the layout root. The third phase corresponds to formatting the current logical object, performed by the recursive "Makelayout" function. Then, in a fourth phase, the module FOR deletes the layout objects not used (empty), verifies that the layout objects that are still open are in compliance (for instance, whether the contents in a balanced multi-column frame are truly balanced, etc.) and closes them by giving them their true sizes; if not, it begins backtracking to reformat the logical objects that are not in compliance, and then closes the processed and formatted document.

The document layout process principally uses the following recursive functions: "Makelayout" (employed by the logical submodule), "Give object ext" and "Give object kernel" (employed by the layout submodules).

Figure 2:
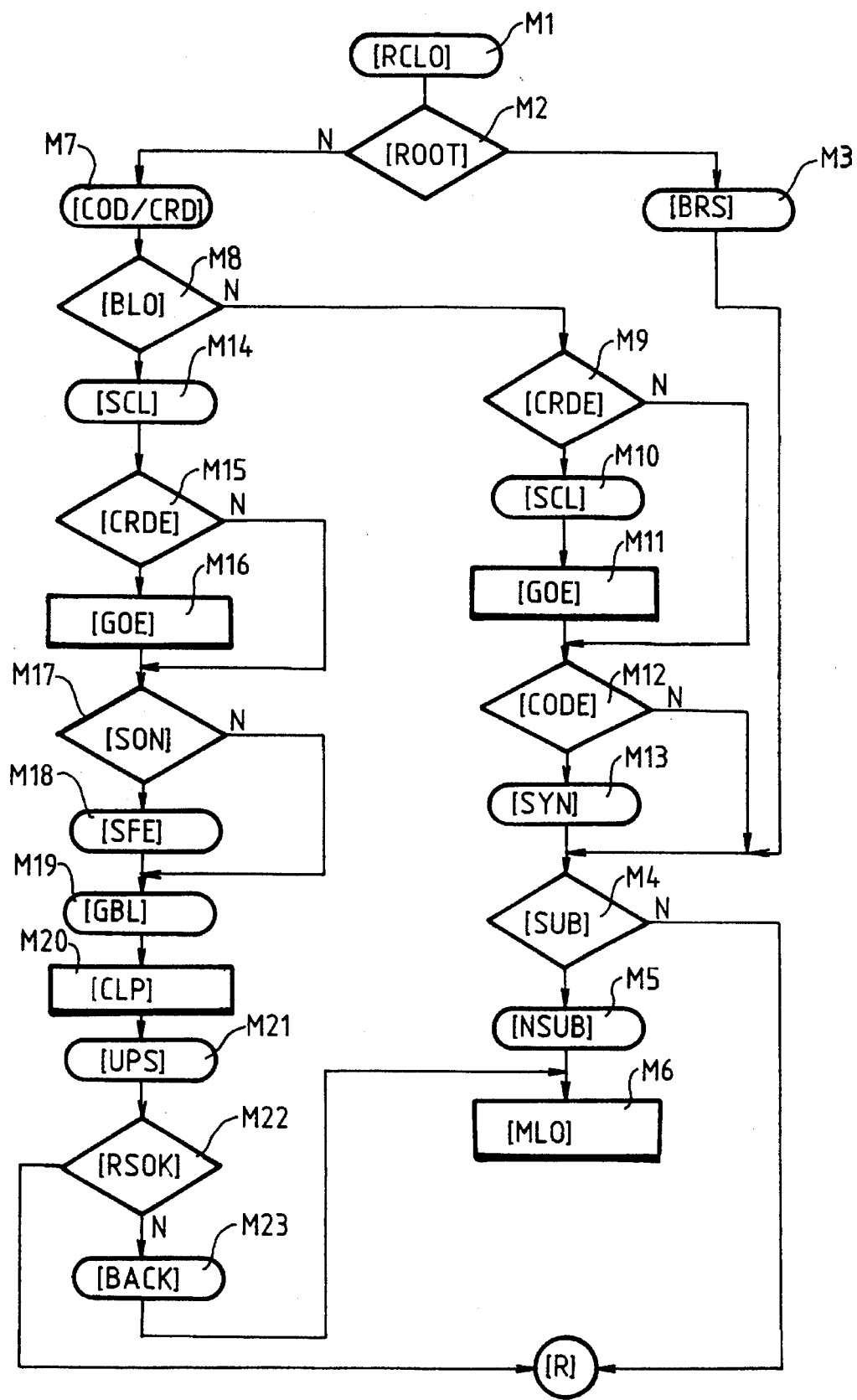
FIG. 2 is a chart showing the various steps performed by the recursive "Makelayout" function.

In FIG. 2, a chart is shown representing the various steps taken by the recursive function "Makelayout". This "Makelayout" function makes it possible to create an object or a set of layout objects to form that current logical object. Its function consists in reading the logical object and invoking other layout functions when necessary, if layout directives or a basic (noncomposite) logical object exists, and then invoking itself to read the subordinate logical objects, thus constructing the layout structure. It constitutes the main procedure of the document layout process and is based on the recursive analysis of the specific logical structure, based on the logical root.

Thus the first step M1 corresponds to reading the current logical object [RCL0], and in particular reading the type of object. In fact, the operation applied depends on the type of logical object read: logical root, composite object, or basic object.

In the second step M2, the following question is asked: "Is the current logical object a logical root?" [ROOT]. If the response is yes, the third step M3 is the creation of the embryonic layout structure [BRS], which means that in accordance with the generic layout structure, as many layout objects as possible in the structure forming this embryo are created.

All the objects requested, that is, without an optional, optional repetitive or choice term, are created, while each time an optional, optional repetitive or choice term is encountered, a temporary layout object is created and inserted into the layout structure. It is indicated that in this position, a potential layout object (or set of objects) will be created later, if a layout directive or content fraction requires that. Next, in the fourth step M4, the question is asked: "Are there any subordinate objects?" [SUB]. If the response is no, then a return [R] to the "Makelayout" function takes place. If the response is yes, then one moves to step M5, in which the next subordinate object [NSUB] becomes the current logical object, then to step M6, which corresponds to the return to the "Makelayout" function [MLO], which invokes itself, and so forth. If contrarily the response in step M2 is no, then the current logical object is either a composite object or a basic object, and the next step is M7, in which the directives that apply to the logical object in question undergo discrimination and are separated into constraint directives and creation directives [COD/CRD]. In the next step MS, a question is asked: "Is the logical object a basic object?" [BLO]. If the response is no, then it is a composite object, and a different question is asked in step M9: "Are there any creation directives?" [CRDE]. A layout object that fulfills the various directives is looked for, moving forward from the current layout position. Thus if the response to M9 is yes, the next step M10 consists in a search for the current layout information stream, to determine the current layout object in this information stream [SCL]. Next, in step M11, the recursive "Give object ext" function (described in conjunction with FIG. 3) is invoked [GOE] to permit the search for and the construction of the pertinent layout object from the current object. The next step M12 consists in asking the question, "Are there any constraint directives?" [CODE]. When the response is positive, then in the course of the next step M13, all the information streams in question are synchronized [SYN]. The next step is again step M4, relating to determining the subordinate objects. If the response to step M9 is no, that is, if there are no creation directives for the composite object in question, then a jump to step M12 is made, determining whether constraint directives exist; if so, steps M13, M14, and so forth are taken. If the response to step M12 is negative, a jump to step M4 is made.

Figure 6:
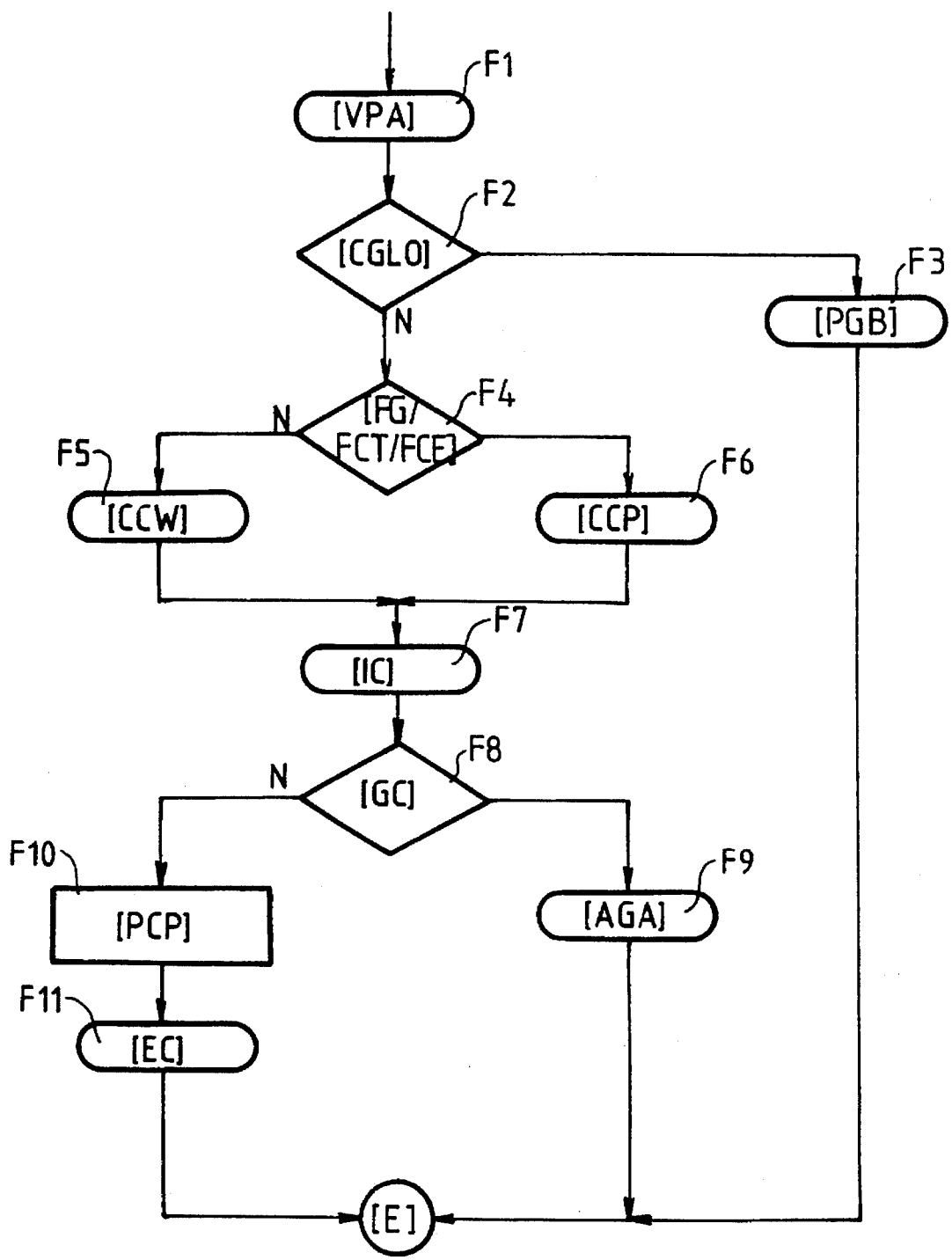
FIG. 6 is a chart showing the various steps taken by the "Fillblock" function.

In addition, if the response to step M8 is yes, the logical object is accordingly a basic object, and the next step M14 is equivalent to step M10; this means that a search for the current layout information stream is made to determine the current layout object in this stream [SCL]. The next step M15 is the question: "Are there any creation directives?" [CRDE]. If so, step M16 that follows is identical to step M11, and the recursive "Give object ext" function is invoked [GOE] to enable the search for and construction of the pertinent layout object from the current object. In step M17, a question is also asked: "Is a major object necessary?" [SON]. Step M18 corresponds to a positive response; in the course of this step, a search is done for a major object [SFE], and then comes step M19, where a block is created and positioned and the available editable zone is calculated [GBL]. Finally, in step M20, the content layout process is invoked [CLP], by way of the "Fillblock" function (described in conjunction with FIG. 6) for laying out the contents.

On the other hand, if the answer to the question asked in step M15 concerning the existence of creation directives is no, then a jump is made to the question asked in step M17, relating to the necessity of finding a major object, and then one goes to steps M18, M19, M20, and so forth. A negative response to the question asked in step M17 involves a jump to step M19, then M20, and so forth.

Once the contents have been laid out by application of the content layout process in step M20, a return to the document layout process is made, and in particular to the "Makelayout" function, where the status of the layout is reported. Step M21 assures the updating of the size of the related objects [UPS]. In step M22, the question is asked, "Is the layout state reported at the end of step M20 correct?" [RSOK]. If the response is yes, this means that there was enough space to make the layout, and so a return [R] to the "Makelayout" function is then made. If the response is negative, that is, if there was not enough space, then step M23 enables starting a backtracking operation, in which the current logical object becomes the object determined in the course of the backtracking, and then a return to the "Makelayout" function [MLO] of step M6 is made.

In summary, it must be remembered that a layout object that complies with the various directives is sought beginning at the current layout position and moving forward. If a requested object is of higher rank than the current object, then the layout objects in the information stream are closed; this means that their final dimensions have been assigned to them, and that nothing else can be added or subtracted except in the case of a backtracking operation; the current layout object is then the major object, and so forth, until an object of higher rank than the objects requested is found.

The search makes it possible to examine a set of current objects until a pertinent object or a temporary object is found. In that case, the compatability between the temporary object and the layout directives is tested. If there is compliance, a new set of objects is constructed. If no object is found in the set of current objects, then the objects are closed; the current layout object is the major object, and the search makes it possible to examine a new set of objects and so forth.

The positions and maximum dimensions that can be used are assigned to the new layout objects, and the available editable zone is recalculated. When the current object is a composite logical object, the current logical object becomes the next object and that one is formatted. If the current object is a basic object, a block is created, its positions and maximum dimensions are determined, and the available editable zone is recalculated. The content layout process is then invoked-to perform the layout of the contents. The state of the layout reported by the content layout process is analyzed. If the result reported is current, the block dimensions are updated, and the available editable zone is recalculated. The current logical object becomes the next object, and that one is formatted. Contrarily, if there is not enough space, then a backtracking operation is performed; that is, reformatting beginning at the same logical object or the preceding one is done, taking the imposed constraints into account. The current logical object becomes the object chosen in the backtracking, and that object is formatted. If an error occurs as well, then an error message is sent. This process is employed until there are no more logical objects to be processed.

Figure 3:
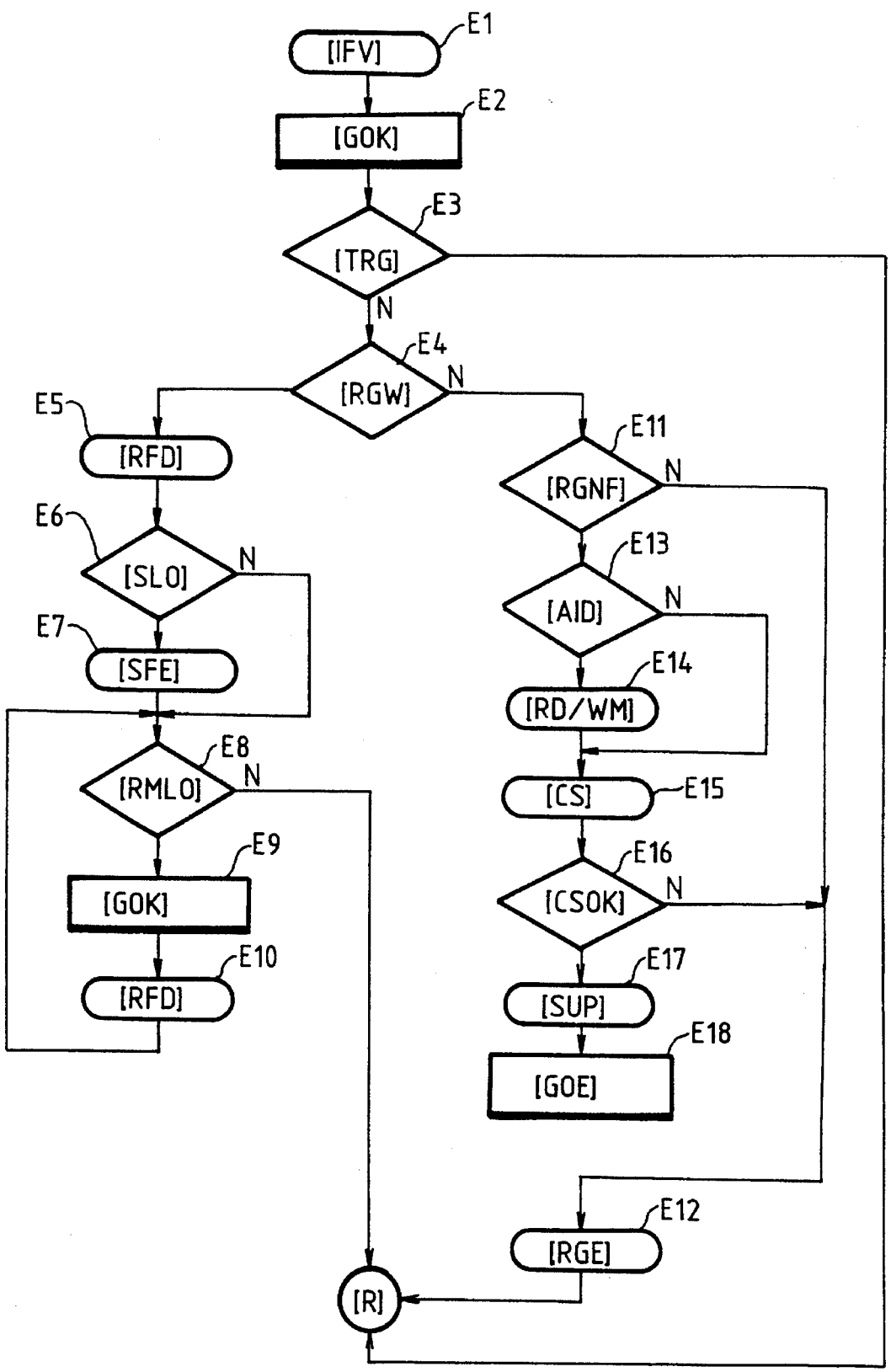
FIG. 3 is a chart showing the various steps taken by the recursive "Give object ext" function.

FIG. 3 is a chart showing the various steps taken in the recursive "Give object ext" function. This function is invoked by the "Makelayout" function, but can also invoke itself. Its purpose is to search for or create (when possible) certain layout objects beginning at the current layout object in the layout structure, these layout objects fulfilling the specified directives. To do so, it invokes the recursive "Give object kernel" function (described in conjunction with FIG. 4), which searches in a set of current layout objects for the subordinate ones. In the event of conflict or incompatability with a layout directive, the "Give object ext" function decides to ignore the latter or to start a backtracking operation. If no pertinent layout object is found, then it invokes itself to restart the same process for the current major layout object, and so forth, from one set of layout objects to another, advancing from the current position forward.

Thus the first step E1 is intended to initialize the flags (tags) and variables [IFV]. Different flags are in fact linked with the layout objects for the sake of instructions as to the situation of those objects (new object, completed object, full object, backtracking, etc.), these flags being initialized during the creation of the object. Also initialized are variables, such as those contained in the table of structures. The first object linked to specified directives is searched for among the objects of the specific layout structure. The recursive "Give object kernel" function [GOK] is invoked in step E2 to search for a pertinent layout object among those subordinate to the current layout object. In step E3, the return is made to the recursive "Give object ext" function, and the table of structures is tested; each directory of the table of structures corresponds to a layout directive, the first of which gives the global result of the search, which is the test result [TRG] of step E3. If the test result is correct, which means that all the directives requested are fulfilled, then a return [R] is made to the "Give object ext" function. If not, the next step E4 corresponds to the question: "Does the global result contain a warning?" [RGW]. If the response is yes, this means that the requested directives are not fulfilled in their entirety, but only in part, and step E5 makes it possible to extract the directives that are found to have been fulfilled [RFD]. Step E6 asks the question: "Is there a directive that requires a layout object of higher rank than the current layout object?" [SLO]. If the response is positive, then step E7 corresponds to a search for an object of higher rank than the current layout object [SFE]. Then step E8 enables asking a new question: "Is there a directive that requires a layout object of lower rank than the current layout object?" [RMLO]. A positive result first leads to step E9, for which the recursive "Give object kernel" [GOK] function is again invoked to search for a pertinent layout object among those subordinate to the current layout object. Next, a return is made to the recursive "Give object ext" function and one moves to step E10, which makes it possible to extract the directives that are found to have been fulfilled [RFD], and finally a return to step E8 is made, until there is no longer any directive requiring a layout object of lower rank than the current layout object. When there is no longer any directive of that type, the response to the question asked in step E8 is negative, and a return [R] is then made to the "Give object ext" function. Moreover, if a directive requiring a layout object of higher rank than the current layout object is not found in step E6, then a jump to step E8 is made, and then to steps E9, E10, E8, etc., or a return [R] to the "Give object ext" function.

On the other hand, if there is a negative response in the question in step E4 asking whether the global result contains a warning, while the test result of step E3 was not correct, then such a response causes a move to step E11. In this step E11, the following question is asked: "Was no requested directive that was fulfilled found in the global result?" [RGNF]. This test makes it possible to handle the interference or conflict between different layout directives. If the response to this question is no, this means that perhaps no directive that was fulfilled was found, but it is impossible to format the object immediately because of some error; for example, the object may be indivisible, and there may not be enough space to put it on the same page. In that case, the global result shows that there is an error [RGE]; during step E12 a backtracking process is also started. Next, a return [R] to the "Give object ext" function is made. Contrarily, if the response to the question [RGNF] of step E11 is positive, this means that no directive that was fulfilled was found, but that conficting directives or directives incompatible with the analysis made exist, and consequently no object is pertinent among the set of objects analyzed. On this hypothesis, the next step E13 asks the following question: "Is there any directive that is incompatible with the analysis made?" [AID]. If so, the move to step E14 means that this directive is omitted, and a warning message is sent [RD/WM]. During the following step E15, a structure test [CS] enables verification of the enclosure of the completed objects. This structure test is also done when the response to the question [AID] in step E13 is negative, that is, when there is no directive that is incompatible with the analysis in progress. Following the test [CS], the following question is asked in step E16: "Is the result of the structure test correct?" [CSOK]. A negative response first means a jump to step E12, since the global result shows an error and a backtracking process has already been started, and then a return [R] is made to the "Give object ext" function. An affirmative response to the question [CSOK] of step E16 produces the move to step E17, during which the major object is chosen to become the current layout object [SUP], and then step E18 corresponds to the return to the "Give object ext" function [GOE], which invokes itself to restart the process for this major layout object, and so forth.

Figure 4:
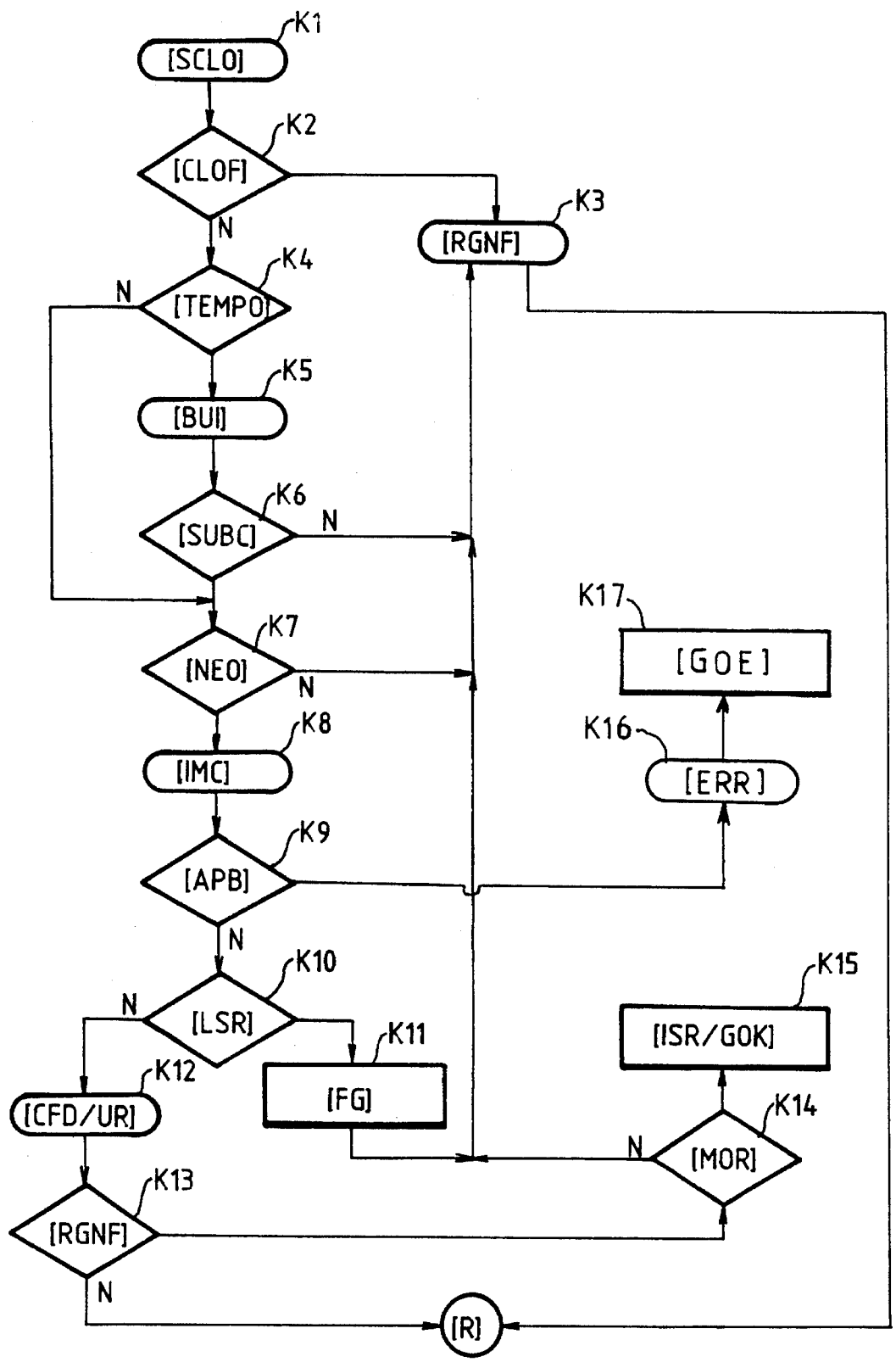
FIG. 4 is a chart showing the various steps taken by the recursive "Give object kernel" function.

FIG. 4 shows a chart with the various steps taken by the recursive "Give object kernel" function. Thus function is invoked to test whether the given layout object fulfills the directives and updates the table of structures and the current layout object. When the layout object is a temporary object, it enables constructing the corresponding set of layout objects. Notably, it makes a search for the first object having specified directives in the current set of layout objects. Simultaneously, it calculates the size, positions the current set of layout objects, and formats the generic contents. The operating rules used by the present function are as follows:

- If an object is completed, it sends a message stating that the layout directives were not found.

- It analyzes the current layout object, in the case of a temporary object; if the object has never been evaluated, it evaluates it; in the case of a requested object, it searches for the layout directives, and once they have been found, it sends a message stating that they have been found.

- It invokes itself to handle the subordinate objects, until the object desired is found, or there are no longer any subordinate objects left.

Hence the first step K1 consists in saving the object, which becomes the current layout object [SCLO]. A question is asked in the second step K2: "Is the current layout object completed or full?" [CLOF]. If the response is yes, then in the course of step K3 the current layout object is saved, and a message is sent to the global result stating that the layout directives were not found [RGNF]. Then there is a return [R] to the "Give object kernel" function. If the current layout object is neither completed nor full, the response to the question in step K2 is negative, and the next step is K4, which asks a second question: "Is the current layout object a temporary object?" [TEMPO]. A positive response leads to step K5, during which the set of layout objects is constructed gradually, meeting the layout directives [BUI]. Next, step K6 relates to a new question: "Has the set of layout objects been created?" [SUBC]. A negative response brings about a return to step K3, in which a message is sent stating that the layout directives were not found, while an affirmative response leads to step K7, where the following question is asked: "Does the search relate to a new object?" [NEO]. Similarly, if the response to the question asked in step K4 is no, that is, if the current layout object is not a temporary object, a jump to step K7 is brought about, to test whether the current layout object is a new object. When the object in question is not a new object, a return to step K3 takes place. Contrarily, if the search bears on a new object, then the position, dimension and size of this layout object are initialized, and the related objects are updated [IMC] in the course of step KS. A new question is then asked in step K9: "Is there any problem concerning the search for the directives?" [APB]. If there is no problem, the next step is K10, in the course of which another question is asked: "Does the logical source attribute apply, or is reference made to a description of an object class of a document external to the document currently being handled?" [LSR]. In effect, the "logical source" attribute is specified for a class of layout objects, if the contents associated with each of the layout objects in this class must be furnished by a class of logical objects, for example, the contents associated with a frame at the top or bottom of one page. This attribute then makes it possible to identify the description of the class of logical objects in question. Similarly, a description of an object class in a given document whose processing is in progress may contain a reference to a description of an object class of a generic document external to the document being processed. The attributes constituting an object class description in the generic document thus referred to may furnish values for the attributes corresponding to this object class description of the document being processed, which attributes refer to this object class description in the document referred to. A positive response to the question [LSR] in step K10 brings on step K11, which the "Fill Gene" [FG] function (described in conjunction with FIG. 5) is invoked, which is used to format generic contents, and then a return is made to step K3 to save the current layout object, while a message is sent stating that the layout directives were not found.

Contrarily, a negative response to the question [LSR] of step K10 leads to step K12, which enables verifying the directives that have been fulfilled and updating the table of structures [CFD/UR]. Then in step K13, the global result is tested: "Was no requested directive that was fulfilled found in the global result?" [RGNF]. If the response is no, a return [R] is made to the function "Give object kernel". If the response is yes, a new question is asked in step K14: "Is a minor object requested?" [MOR]. If a minor object is not requested, a return to step K3 is made, and a message is sent stating that no layout directives that have been fulfilled were found. If the response to the question in step K14 is positive, this leads to step K15, in which if the layout object sought is higher in rank than the current layout object, a message is sent stating that the directives that have been fulfilled were not found, while for each object subordinate to a layout object, the subordinate object becomes the current layout object processed by the "Give object kernel" function [ISR/GOK].

When the response to the question [APB] in step K9 is positive, that is, if there is a problem concerning the search for directives (insufficient editable zone, backtracking, etc.), then an error message [ERR] is sent in step K16, and a return is made to the recursive "Give object ext" function [GOE], which is step K17.

Figure 5:
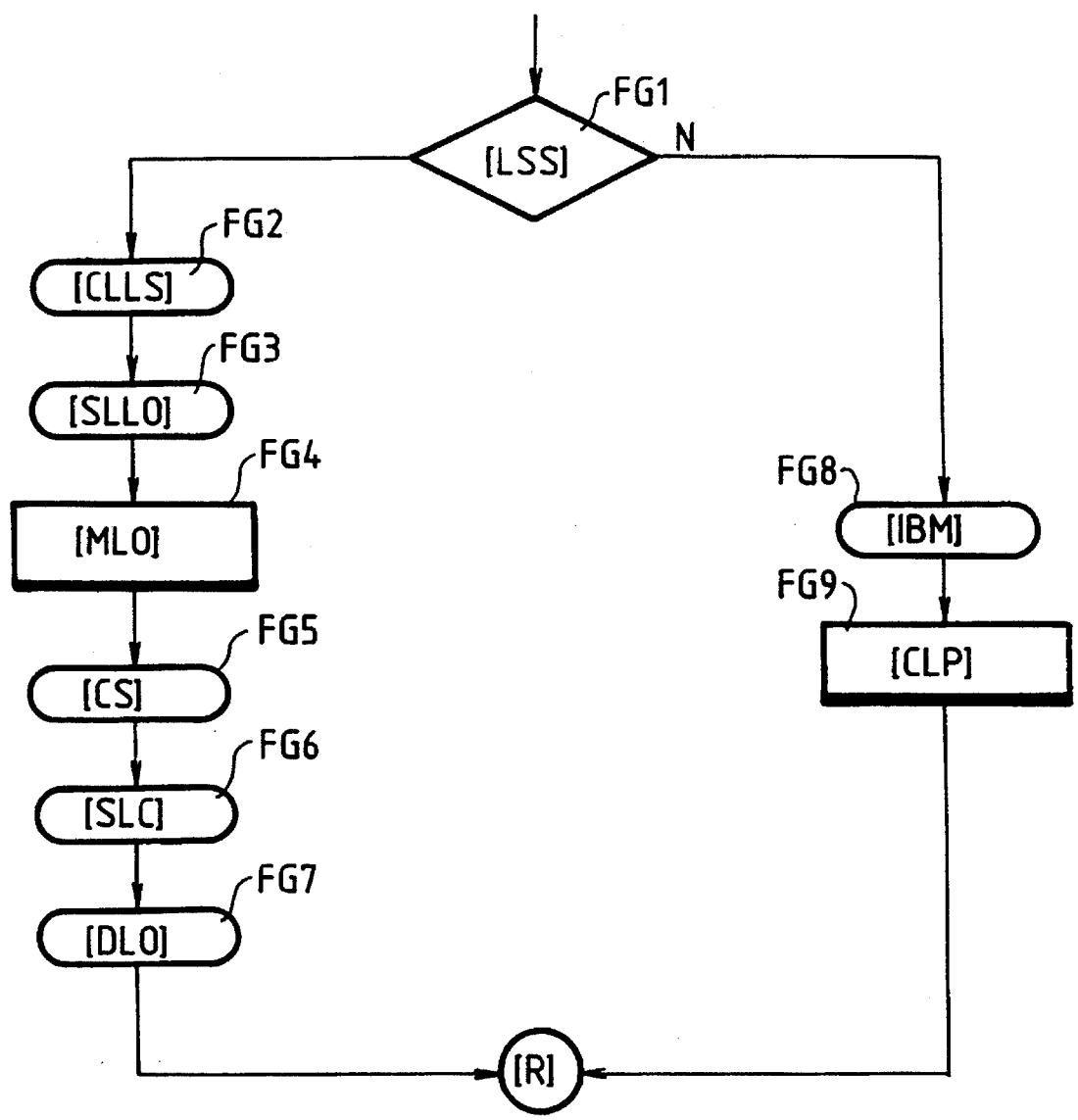
FIG. 5 is a chart showing the various steps taken by the "Fill Gene" function.

FIG. 5 shows a chart with the various steps taken by the "Fill Gene" function. This function is used to format the generic contents, on the one hand in the case where a "logical source" attribute applies (for example for a frame at the top or bottom of a page) by creating the corresponding set of specific logical objects, and then invoking the "Makelayout" function for formatting it and deleting once it is completed, and on the other hand, in the case of a reference to an object class description of a generic document external to the document being processed (for example, a generic block), by fixing the positions and dimensions of the corresponding block and by applying the content layout process by invoking the "Fillblock" function.

The first step FG1 includes the question: "Is the logical source attribute specified for the current layout object?" [LSS]. A positive response is followed by step FG2, which consists in creating the corresponding set of specific logical objects [CSLS], and then step FG3, in the course of which the current logical objects as well as the current layout objects are saved [SLLO]. Next, the recursive "Makelayout" function [MLO] is invoked in the following step FG4 for formatting the logical objects. At the end of step FG4, a return is made to the "Fill Gene" function. The next step FG5 consist in verifying and closing the completed layout objects by assigning them their true dimensions [CS]. In step FG6, the logical objects and the layout objects that have been saved are again considered to be the current logical objects and the current layout objects [SLC]. Finally, in step FG7, the set of logical objects created beforehand and now completed is deleted [DLO], and then a return [R] is made to the "Fill Gene" function.

In the case where the response to the question [LSS] of step FG1 is negative, this means that a reference exists to an object class description of a generic document external to the document being processed. Step FGS, which follows, corresponds to the operation of initializing the position and dimensions of the block [IBM] corresponding to the current layout object. Then in the following step FG9, the content layout process is applied [CLP] by way of the "Fillblock" function (described in conjunction with FIG. 6) for formatting the block in question, whose size is updated at the time of the return [R] to the "Fill Gene" function.

The content layout process is applied in three essential steps: a first step, which is the search for the contents to be formatted; a second step, which is the evaluation of attributes (presentation styles); and a third step, which is the formatting of the contents.

The content layout process uses, among other functions, the "Fillblock" function, which is the main procedure used by this process. The "Fillblock" function is described by means of FIG. 6 in its characteristic steps; it acts as an interface between the content layout process and the document layout process. The "Fillblock" function formats or reformats all or some of one (or more) content portions associated with a logical object (either beginning with the specific logical structure or produced temporarily from an attribute) in a block inside an available editable zone of maximum dimensions. The "Fillblock" function verifies whether the first parameter received relates to a specific logical object or to a temporarily created logical object, and by means of flags (also called tags), taking into account at all times the particular context for layout directives or reformatting due to a backtracking operation or displacing of some or all of a content; the flags are positioned after the document layout process has performed context analysis. The context often depends on the response of the "Fillblock" function to an earlier invocation and also on the compliance with the layout directives.

In general, processing of a logical object that is associated with a plurality of subordinate objects is done as follows: One block designates a unique content portion, which is formatted unless a provision is made for concatenation. If a logical object has more than one subordinate content portion, this fragmentation is the consequence of earlier formatting. The contents of these processable subordinate objects will be formatted in the same content portion, as much as possible. A "content portion to be written" is created when necessary, in a process step in which the contents to be processed are searched for, the attributes applying to them are evaluated, and the formatted content portion is generated. The "content portion to be written" is associated with the block. The first subordinate object of the logical object to be treated is opened and becomes the current "content portion to be read". The contents of the current "content portion to be read" are formatted in the "content portion to be written". Once the formatting of the "content portion to be read" has been done, the "content portion to be written" is removed from the list of subordinates of the logical object and then deleted. The next subordinate, which is now the first on the list, also becomes the current "content portion to be read". The operation is repeated until all the subordinates have been processed or until an interruption in the formatting occurs due to a fatal error or a lack of space in the layout object. For termination purposes, the "content portion to be written" is added to the list of subordinates of the logical object. Contrarily, when the formatting is interrupted (for example for lack of space), the "content portion to be read" remains the first one on the list of subordinates and is not deleted. Similarly, the "content portion to be written" is added to this list and becomes the last on the list. It contains a formatted content portion of the "content portion to be read".

The content layout process cannot create the layout objects necessary for continuing the formatting. Also, it analyzes whether the "orphan size" attribute has been adhered to and returns the proper values to the document layout process.

Hence "Fillblock" is invoked by the recursive "Makelayout" function (see FIG. 2) and by the "Fill Gene" function (see FIG. 5). The first step F1 consists in verifying whether the first parameter received [VPA] corresponds to an obligatory logical object or to a temporary logical object created from the generic structure relating to the top or bottom of a page. This verification is done by means of an information parameter, which can assume three integral values: a first value for a specific logical object, a second value for a temporary logical object, and a third value to distinguish a generic layout content. The second step F2 corresponds to the following question: "Do the contents analyzed originate in a generic layout object?" [CGLO]. If the information parameter is defined at the third value, then the response is yes, and since the contents have already been formatted, the third step F3 consists in determining the horizontal and vertical dimensions and the positions of the blocks [PGB] and then exiting from the "Fillblock" function [E]. If the response to the question in step F2 is negative, three other alternative questions are asked in step F4: "Is the logical object now being processed an object processed before?" or "Is there any flag indicating that concatenation is requested?" or "Is there any flag indicating that the contents to be formatted must not be interrupted?" [FG/FCT/FCE], which can also be worded this way: "Are there any recoverable attributes, or must they all be recalculated?". If none of these three questions can be answered positively, the current context associated with the analyzed object is completely deleted [CCW] from the current context in memory; this is step F5. Conversely, if a positive response is made to one of these three questions, then the current context is only partly deleted [CCP] from the current context in memory; this is alternative step F6. The step following either step F5 or step F6 is step F7, which is searching for data belonging to the object to be formatted (number of subordinate objects to be processed, index of the first one to be processed, which depends on the context, etc.) and storing in memory some of the information (fields) of the current context [IC]. Then the following question is asked in step FS: "Are the contents to be formatted graphical?" [GC]. A positive response leads to step F9, which reserves a particular operation that makes it possible to adjust the attributes associated with the graphical contents (number of lines, vertical and horizontal dimensions) [AGA]. Since some of the graphical contents cannot be shared, it is then necessary to create a formatted "content portion to be written" and to copy all the information relating to the contents as well as the attributes of the "content portion to be read" in the "content portion to be written". The end of step F9 is the exit [E] from the "Fillblock" function. If the response to the question asked in step F8 is negative, that is, if the contents to be formatted are not graphical, then the next step F10 is the processing of each content portion [PCP] belonging to the object to be formatted, details of which are provided in conjunction with the description of FIGS. 7, 8 and 9. Once the processing [PCP] has been done, the next step F11 consists in terminating the processing of the "Fillblock" function in particular and updating and freezing, for transmission of the information belonging to the logical object and to the block processed, the flags, the information parameter, etc., and closing the open objects [EC], then exiting [E] from the "Fillblock" function in order to return to the application of the document layout process.

Figure 7:
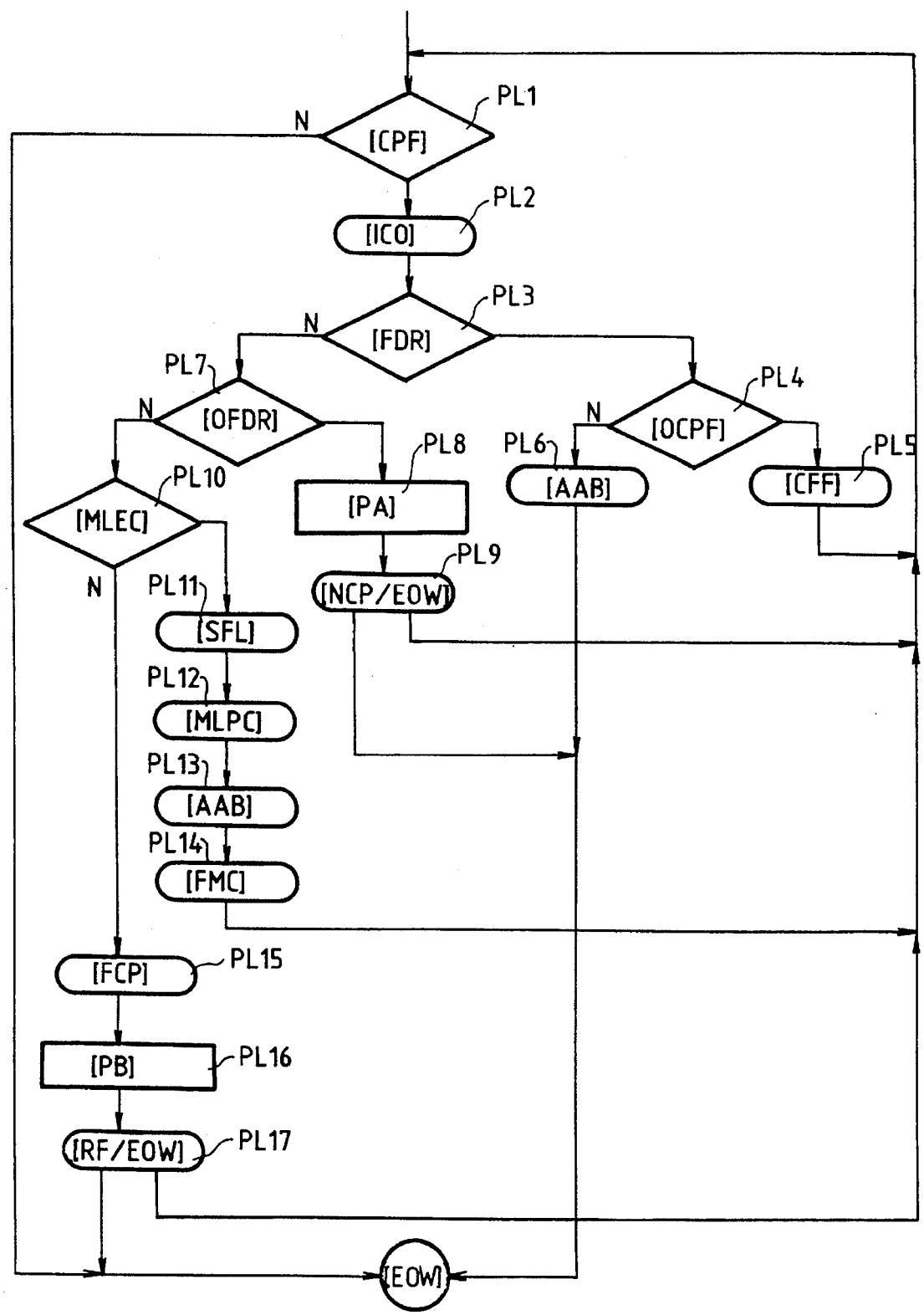
FIG. 7 is a chart showing the processing loop used by the "Fillblock" function.

FIG. 7 shows a chart representing the processing loop [PCP] of step F10 (FIG. 6) used by the "Fillblock" function.

Hence a first question is asked at the time of the first step PLI: "Is there a content portion to be formatted?" [CPF]. A negative response leads directly to the output from the loop [EOW]. A positive response leads to step PL2, in the course of which the content to be formatted (or reformatted) is searched for, the attributes applying to it are estimated, and the formatted content portions are generated [ICO]. The information (fields) of the current context that had not been taken into consideration of the time of the procedure [IC] of step F7 (FIG. 6) are taken into account, and the context flag (tag) is then updated if necessary. Then in the course of the next step PL3, another question is asked: "Does the context flag indicate a value signalling that reformatting is not necessary?" [FDR]. A positive response to this question leads to a subsequent question in step PL4: "Are there any other content portions to be formatted?" [OCPF]. If the response to that question is yes, then in step PL5 the formatting must be continued (the objects having been partially formatted), and the context flag is set at either the value corresponding to a set of content elements called a contents architecture class of the logical object (which means that the logical object contains a mixture of formatted-processable content portions, and that the formatting will be done by a new invocation of the "Fillblock" function) or to the value corresponding to the processing of the next content portion [CFF], then a return to step PL1, PL2, etc. is made. If the response to the question [OCPF] in step PL4 is negative, then there are no content portions to be processed, which leads to step PL6, during which the block attributes are adjusted [AAB], that is, the presentation attributes are created, associated with the block, and the various attributes of the standard default value are specified in this new presentation style. The end of step PL6 is followed by an exit from the loop [EOW].

On the other hand, if the response to the question [FDR] asked in step PL3 is no, then a new question is asked in the next step PL7: "Does the context flag indicate a value other than that signalling that reformatting is not necessary and that there are no movable lines between two blocks?" [OFDR]. In this hypothesis, the flag can assume five different values (b–f), corresponding to the following cases:

b: Conditions are normal; all the contents associated with an object must be formatted within a block without concatenation.

c: Concatenation is anticipated.

d: The formatting must be continued (objects whose content has been partially formatted), the flag being at the value indicating that not all the contents of a content portion have been formatted, and that the "orphan size" attribute has been met; the content layout process must then continue the formatting of the contents, in a new block of a new page.

e: This value is used whenever the "Fillblock" function, after having been invoked earlier, has told the document layout process that the contents have been cut. For two successive content portions, the first portion already formatted is redone, and one continues with the second part that has not yet been formatted (examples: indivisible object, or "orphan size" attribute not adhered to).

f: Formatting of the next content portion must be done (example: logical object with multiple associated content portions).

If the response to the question [OFDR] in step PL7 is yes, then a jump to a special operation [PA] is anticipated; this optional [PA] of the content portions without movable lines between two blocks is described hereinafter in conjunction with FIG. 8 and involves step PL8. The next step PL9 offers two outcomes [NCP/EOW]. The first is used when the formatting must be continued for objects that have already been partially formatted, the context flag then being set to the value corresponding to the processing of the next content portion [NCP], and a return is made to steps PL1, PL2, etc. The second outcome is used when there are no longer any content portions to be processed; an exit is then made from the loop [EOW].

Conversely, if the response to the question [OFDR] in step PL7 is no, then a new question is asked in step PL10: "Does the context flag indicate movable lines located at the end of contents of a logical object already formatted beforehand?" [MLEC]. The flag, in this hypothesis, can assume two different values g and h, corresponding to the following cases:

g: Value used to displace only the end of one content of a logical object, already formatted in a preceding block, from that preceding block to another block, fulfilling the "widow size" attribute; for example, when after an invocation of the "Fillblock" function, a response has been given signifying that a number of formatted lines in the first block of a new page, following a page break, is less than the "widow size".

h: Value used to displace lines when a concatenation applies to the logical object of g.

The values g and h may also be indistinguishable if the context difference is minute.

An affirmative response to the question [MLEC] of step PL10 leads to step PL11, which consists in a search for major logical objects [SFL]. In fact, the block contains content portions that may have different major logical objects when concatenation is involved. All these major logical objects must be updated with a new formatted "content portion to be written" that is generated. Step PL12 corresponds to the procedure of invoking the process for processing movable lines [MLPC] and in particular a process applied to the contents described in conjunction with FIGS. 8 and 9. Step PL13 relates to the adjustment of block attributes [AAB] (same procedure as in step PL6), while in step PL14 the context flag is set at a value i, which indicates that the number of lines allowed in the preceding block has been used, and the remaining content in the "content portion to be read" must be formatted in a different block [FMC], and then a return is made to step PL1, PL2, and so forth.

A negative response to the question [MLEC] in step PL10 means that there are movable lines to be displaced between two blocks, and that the remaining cases must be processed. This negative response leads to step PL15, which enables counting the cases remaining to be processed, taking into account the context flag values [FCP]. On this last hypothesis, the context flag can assume four different values, corresponding to the following cases:

i: The content portion processed is the first content portion to be displaced to a second block, the number of lines allowed in a first block having been used.

j: The content portion now being processed belonged to a first block, and the first block can still have other subordinate content portions to be displaced to the second block, each of which must be processed, and the major logical objects must also be updated.

k, l: The second block was not empty before displacing of the lines, and its own subordinate content portions must be processed and the contents must be concatenated with the end of the current content in the block; the value k means that the processed content portion is the first to be reformatted in the second block and the first subordinate content portion must be processed, while the value 1 means that the processed content portion belongs to the second block but is not the first to be reformatted in that block, and the next content portion must be processed.

Next, step PL16 corresponds to a jump to a special operation, or processing, and this processing [PB] of content portions with movable lines between two blocks is described hereinafter in conjunction with FIG. 9. Step PL7 makes it possible either to count and send the context flag values, defined as j, k, 1 [RF], in order to effect a return to steps PL1, PL2, etc., or to exit from the loop [EOW] when there is no longer any content portion to be processed.

Figure 8:
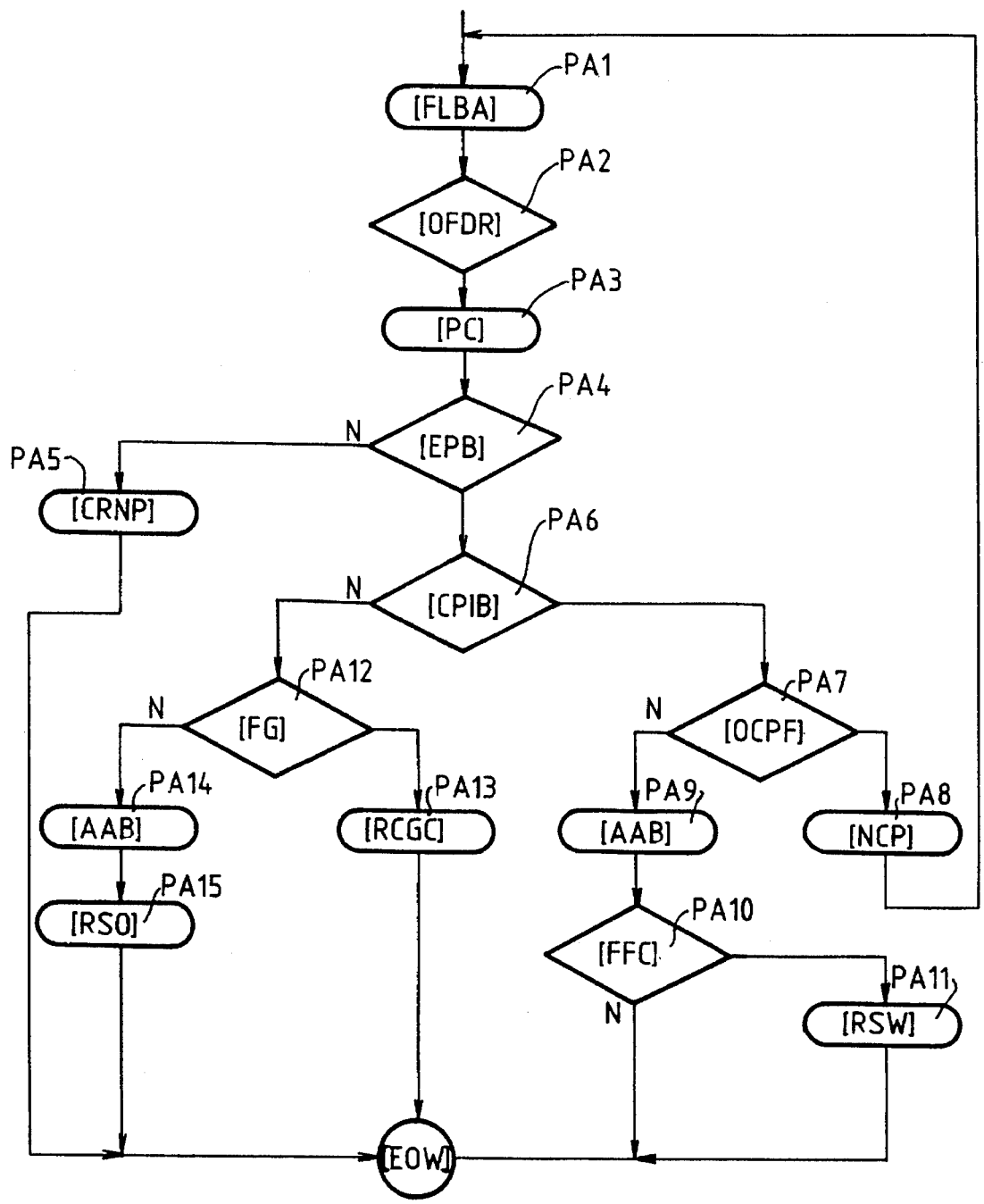
FIG. 8 is a chart of a jump from the loop of FIG. 7 for processing content portions that lack movable lines.

FIG. 8 shows the chart for a jump from the loop of FIG. 7 for processing content portions without movable lines. Step PA1 corresponds to the steps PL1, PL2, PL3 (negative response) at the beginning of the "Fillblock" processing loop [FLBA], while step PA2 corresponds to step PL7, in which a positive response was made to the question [OFDR]. In step PA3, a reading process is applied to the contents [PC]. Hence when the contents are in a content portion, the latter must be read by introducing a shift into the reading, and this shift is part of the information (fields) of the current context. The initial value of this shift depends on the context flag value. The shift is updated when the process [PC] is authorized to read or reread the content portion beginning at the new shift, until information is received relating to a (fatal) error, an end of block, or an end of contents. Similarly, when the contents are in the "content generator" attribute, certain characters may already have been formatted, and the process must continue to read beginning at the shift value of the preceding reading. When there is no longer any space for the current line, then a backtracking operation must be started in order to return to the preceding line; the information relating to the content of that line are saved, and the current context is updated. In step PA4 that follows, a question is also asked: "Is there enough space in the block to receive the line or lines of the content portion?" [EPB]. If the space is not sufficient, an exit [EOW] from the processing loop to step PA5 is made, and a report is sent [CRNP] signifying that there is no more space (for even a single line) in the available editable zone. If the space is sufficient, another question is asked in step PA6: "Is the block suitable for receiving all of the formatted content portion?" [CPIB]. If the block is perfectly suitable, then another question is asked in step PA7: "Are there any other content portions to be formatted?" [OCPF]. A positive response leads to step PAS, in the course of which the context flag is set to the value f, the formatting of the next content portion must be done (objects partially formatted) [NCP], and a return is made to the beginning of the loop at step PA1, PA2, and so forth. If the response to the question [OCPF] of step PA7 is negative, the next step PA9 is the phase of block attribute adjustment [AAB]. Next, a question is asked in the following step PA10: "Is the context flag at the value d?" [FFC]. If the response is affirmative, this means that the context flag indicates that following an earlier invocation of the "Fillblock" function, that function has signaled the document layout process that the contents have been cut and that the "orphan size" attribute was adhered to, so consequently the content layout process must verify formatting of the contents, taking into account the "widow size" attributes. This affirmative response leads to step PA11, in the course of which a return procedure relating to the analysis of the "widow size" attribute [RSW] is brought about, followed by an exit from the processing loop [EOW]. If conversely the response to the question [FFC] in step PA10 is negative, that leads directly to an exit from the processing loop [EOW].

Furthermore, if the question [CPIB] asked in step PA6 yields a negative response, a final question is asked in step PA12: "Does the information parameter indicate that the logical object is a temporary object?" [FG]. A positive response leads to step PA13, during which a fatal error relating to the generic contents at the top and bottom of a page is reported (or a warning is sent). This error must be interpreted as follows: The generic contents at the top or bottom of a page cannot be integrally contained in the available editable zone. It is not possible to split a heading portion on one page and put one part on top of another. An error in estimating the sizes of the frames has certainly occurred; to continue would result in incorrect pagination. The report of the fatal error is followed by an exit from the processing loop [EOW]. Contrarily, if the response to the question [FG] in step PA12 is negative, then the next step PA14 is the block attribute adjustment phase [AAB], which is followed by step PA15, in the course of which a return procedure relating to the analysis of the "orphan size" attribute [RSO] is brought about, which in turn is followed by an exit from the processing loop [EOW].

Figure 9:
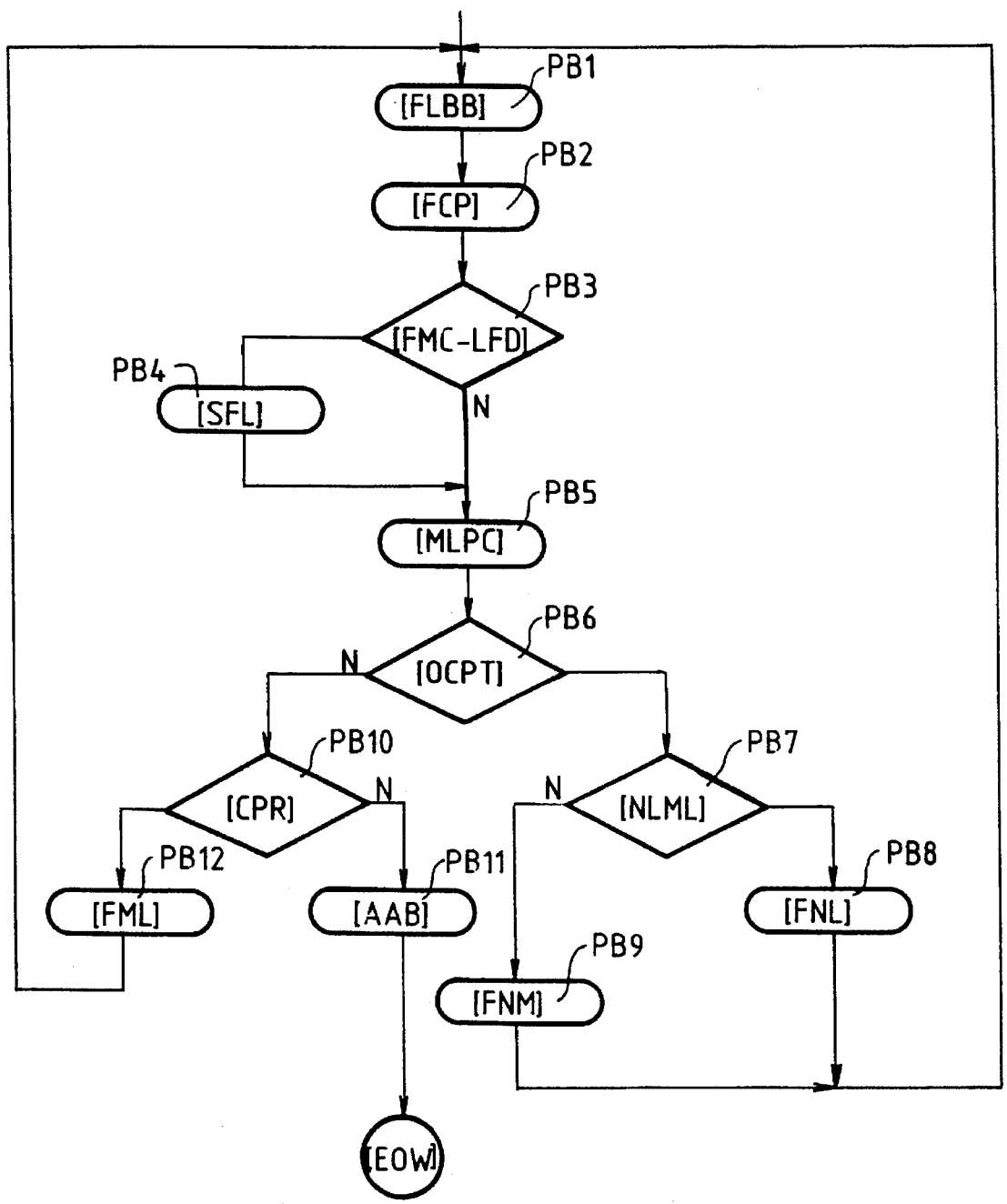
FIG. 9 is a chart for a jump from the loop of FIG. 7 for processing content portions that have movable lines.

FIG. 9 is a chart showing a jump from the loop of FIG. 7 for processing content portions that have movable lines. In this jump, some lines must be displaced from a first block to a second block. These lines to be displaced may belong to several content portions (in the case of a layout directive of the "same layout object" type, or to fulfill a presentation attribute of the "widow size" type). The content layout process performs various operations which depend on the situation of the content portions to be reformatted. As has been seen above, the "Fillblock" function uses flags that make it possible to distinguish the following different contexts:

i: The content portion processed is the first content portion to be displaced to a second block, the number of lines allowed in a first block having been used.

j: The content portion now being processed belonged to a first block, and the first block can still have other subordinate content portions to be displaced to the second block, each of which must be processed, and the major logical objects must also be updated.

k, l: The second block was not empty before displacing of the lines, and its own subordinate content portions must be processed and the contents must be concatenated with the end of the current content in the block; the value k means that the processed content portion is the first to be reformatted in the second block and the first subordinate content portion must be processed, while the value 1 means that the processed content portion belongs to the second block but is not the first to be reformatted in that block, and the next content portion must be processed.

Step PB1 corresponds to steps PL1, PL2, PL3 (negative response), PL7 (negative response), and PL10 (negative response), from the beginning of the "Fillblock" processing loop [FLBB], and step PB2 corresponds to step PL15 that counts the cases remaining to be processed, taking the values i, j, k, l for the context flag into account [FCP]. Step PB3 follows, in which the question is asked: "Is the context flag different from the value i, and is the major logical object different from that of the previous content portion?" [FMC-LFD]. A positive response means that the context flag does not indicate that the number of lines allowed in a first block has been used, but contrarily indicates one of the values j, k or l; the remainder of the contents of the "content portion to be read" must be formatted in a second block, but the major logical object is different from that of the previous content portion. This positive response leads to step PB4, in which a search for major logical objects is made [SFL], and these are also updated. Then in step PB5, the movable line processing procedure [MLPC] is invoked, which invokes the reading process applied to the contents already described in conjunction with step PA3 in FIG. 8. In addition, a negative response to the question [FMC-LFD] of step PB3 leads directly to step PB5 [MLPC]; in that case, the search for major objects is of course needless. In the course of the next step PB6, the question is asked: "Are there any other content portions to be processed?" [OCPT]. If there are other content portions to be processed, the next step is PB7, in which another question is asked: "Does the context flag indicate the value k or the value 1" [NLML]. A positive response leads to the setting of the context flag at the value l [FNL] (the next subordinate content portion must be processed, and the content concatenated at the end of the current content in the second block); this is step PB8, followed by a return to the beginning of the processing loop, that is, steps PB1, PB2, and so forth. Contrarily, a negative response leads to the setting of the context flag at the value j [FNM] (the subordinate content portions must be processed and the major logical objects must also be updated), which is then step PB9, which is followed by a return to the beginning of the processing loop, to steps PB1, PB2, etc. Conversely, if there is no longer any content portion to be processed, this negative response to the question [OCPT] of step PB6 leads to the following question in step PB10: "Is there any content portion whatever to be reformatted in the next block?" [CPR]. If there is no longer any content portion to be reformatted, then step PB11 follows, to perform the block attribute adjustment [AAB], and then an exit from the processing loop [EOW] is brought about. Contrarily, if there are remaining content portions to be reformatted, then in the course of the next step PB12, the context flag is set at the value k [FML] (the first content portion must be reformatted and concatenated to the end of the current content of the second block), and then a return is made to the beginning of the processing loop, to steps PB1, PB2, etc.

Thus the link that connects the content layout process to the document layout process has mainly to do with a context, an editable zone, layout objects and logical objects, and also some constraints (indivisibility, concatenation, etc.), and what the content layout process sends is the formatted content portions and updated dimensions, along with a context report.

Aside from the advantages described in the introduction, the formatting module that employs the layout method of the invention advantageously makes it possible to perform a large number of functions, some of which will be described immediately hereinafter.

At the time of the application of the layout method, the logical objects are laid out in logical order, to produce a specific layout structure in which a plurality of data streams may be present. This makes it possible to support multiple columns ("snaking" and synchronized columns, synchronized columns being used above all to make tables) and footnotes. It becomes possible to balance snaking columns of unequal widths.

The various attributes used authorize automatic numbering of pages, sections, footnotes, drawing figures, tables, and so forth.

Once a logical description has been laid out, the formatting can be stopped by assigning an additional parameter during the function of the formatting module, this parameter being an object identifier of this logical description.

Partial formatting of a processable document from one given logical description to another is also possible and advantageous. Hence when a processable document is received, part of it that one wishes to look at quickly can be formatted for rapid display. Formatting can then be resumed.

A plug for justification or hyphenation is also possible, which enables replacing the justification algorithm with a different one and to modify the hyphenation, which most of the time depends on the languages used.

In addition, the formatting module can support a large number of character fonts and font sizes.

Finally, the formatting module advantageously authorizes the formatting of any type of writing, that is, where characters are written from top to bottom, from left to right or from right to left.

We claim:

1. A layout method for structured documents containing text and graphics and including a generic logical structure, a specific logical structure and a generic layout structure, implemented by a formatting module which reads said generic logical structure, specific logical structure and generic layout structure to create a specific layout structure, wherein said formatting module uses a layout method for laying out a document to create the specific layout structure in accordance with the generic layout structure and information derived from said specific logical structure, said generic logical structure, and layout styles, and a method of laying out the contents of the document by using information contained in presentation styles to lay out various content portions of the document in available zones when said layout method is used, wherein said layout method includes the steps of utilizing a plurality of recursive layout processes to create the specific layout structure, a highest-level object in a hierarchy of the specific layout structure, creating an object called a physical root, and, depending on the generic layout structure, evaluating a "subordinate objects generator" attribute of the physical root to create the entire structure required, wherein when the "subordinate objects generator" contains a required or repetitive term, a layout object is created, and when the "subordinate objects generator" contains an optional term, an optional repetitive term, or a term of choice, a temporary object is created; and, based on the highest-level of a logical root object in the hierarchy of the specific logical structure, applying a recursive operation to all subordinate objects of the logical root and continuing said recursive operation until said logical root is reached again by scrolling upward, establishing constraints of creation and placement, and further wherein, if a "subordinate objects generator" attribute contains a repetitive term, two different objects are created; said different objects including an obligatory object, or a sequence of corresponding objects, and a temporary object containing an optional repetitive term, and, if a temporary repetitive optional object is used, creating objects corresponding thereto and, a different, equivalent, repetitive optional temporary object, and further wherein the recursive layout processes for analysis of the structure are employed by submodules of the formatting module, which comprise a first recursive submodule called a logical submodule and first and second recursive layout submodules, and includes the steps of reading the logical objects by said first recursive submodule until access to the layout structure is gained, analyzing layout objects by the said layout modules until a required layout object has been found, searching for a layout object by the first layout module in a set of layout objects given and invoked by the second layout submodule, which is interested in a current layout object contained in a current flow of information, if the analysis does not successfully find said current layout object, invoking the second layout submodule by the logical submodule or invoking itself and repeating the processes until the analysis has been achieved.

2. The layout method of claim 1, further including the step of initiating a backtracking process for modifying or deleting already formatted portions of the document, including searching by the layout submodules for the layout objects to be displaced and corresponding logical objects, or vice versa, wherein a correspondence is made by using content portions;

searching for the object to be reformatted that is a higher-ranking object and is common to all logical objects in question, flagging the object to be reformatted for each hierarchical level, displacing the layout objects and the content portions in question, and conducting dialog between the layout submodules, which send an error message to the logical submodule, which process each logical object and verify whether the logical object in question is flagged, and if said logical object is flagged, reformatting all flagged subordinate objects, while if not flagged, responding with an error message.

3. The layout method of claim 2, wherein a recursive "Makelayout" function is employed by the logical submodule to create one or a set of layout objects for formatting a current logical object and includes reading the logical object by discriminating the logical root, reading a composite object, or a basic object, and invoking layout functions employed by the layout modules when the object is basic or when layout commands require that the layout functions be involved, and then invoking itself to read subordinate logical objects.

4. (amended) The layout method of claim 3, wherein a recursive "Give object ext" function is employed by the second layout submodule invoked by the recursive "Makelayout" function or by itself and searches for or creates a layout object beginning at the current layout object in the layout structure, the layout object being created in accordance with specified commands, invoking the recursive "Give object kernel" function employed by the first layout submodule in a first period of time by said "Give object ext" to search among subordinate objects of a set of current layout objects, and in case of a conflict or incompatibility with a layout command ignoring that command or starting a backtracking operation, and in a second period of time, if no pertinent layout object is found, invoking itself to restart the same process for a current higher-ranking layout object.

5. The layout method of claim 4, wherein the recursive "Give object kernel" function employed by the first layout submodule searches for the first object having specified commands in a set of current layout objects by formatting generic contents thereof, and:

- if an object is completed, the first layout submodule responds with a message stating that the layout commands have not been found;

- said first layout submodule analyzes the current layout object; if the current layout object is a temporary object that has never been evaluated, said first layout submodule evaluates the current layout object; if the current layout object is a required object, the first layout submodule seeks the layout commands, and sends a message stating that the layout commands have been found;

- said first layout submodule invokes itself to process the subordinate objects, until the object desired has been found or until there are no more subordinate objects left.

6. The layout method of claim 5, wherein a "Fill Gene" function is invoked to format the generic contents, where a "Logical source" attribute applies, by creating a set of specific logical objects corresponding to the "logical source" attribute, invoking a "Makelayout" function for formatting the generic contents, and once completed deleting it, and if a reference is made to a description of an object class of a generic document external to the document being processed, fixing positions and dimensions of a corresponding block and applying the layout method for the contents.

7. The layout method of claim 6, wherein a "Fillblock" function is invoked in order to format or reformat all or part of a content portion associated with a logical object and with its subordinate objects (either on the basis of the specific logical structure or temporarily produced on the basis of an attribute) in a block inside an available editable zone of maximum dimensions, verifying by the "Fillblock" function whether a first parameter received relates to a specific logical object or to a temporarily created logical object and flagging the context relating to layout commands, reformatting commands by a backtracking procedure, and displacing all or some of a content by context flags and positioning the context flags after analysis of the context by the layout method of the document.

\* \* \* \* \*